United States Patent
Tao et al.

(10) Patent No.: US 9,780,812 B2
(45) Date of Patent: Oct. 3, 2017

(54) INFORMATION TRANSMISSION APPARATUS, INFORMATION DETECTION APPARATUS AND TRANSMITTER

(71) Applicant: FUJITSU LIMITED, Kawasaki (JP)

(72) Inventors: Zhenning Tao, Beijing (CN); Hao Chen, Beijing (CN)

(73) Assignee: FUJITSU LIMITED, Kawasaki-Shi (JP)

( * ) Notice: Subject to any disclaimer, the term of this patent is extended or adjusted under 35 U.S.C. 154(b) by 22 days.

(21) Appl. No.: 15/060,055

(22) Filed: Mar. 3, 2016

(65) Prior Publication Data

US 2016/0261446 A1    Sep. 8, 2016

(30) Foreign Application Priority Data

Mar. 6, 2015 (CN) .......................... 2015 1 0100233

(51) Int. Cl.
*H04B 1/04* (2006.01)
*H04L 27/26* (2006.01)
*H04L 1/00* (2006.01)

(52) U.S. Cl.
CPC ............. *H04B 1/04* (2013.01); *H04L 1/0075* (2013.01); *H04L 27/2615* (2013.01); *H04L 1/0071* (2013.01)

(58) Field of Classification Search
CPC ....... H04B 1/04; H04L 1/0071; H04L 1/0075; H04L 27/2615
See application file for complete search history.

(56) References Cited

U.S. PATENT DOCUMENTS

2013/0100873 A1* 4/2013 Arnaud ................. H04L 12/189
370/312
2013/0188583 A1* 7/2013 Lan .................... H04W 72/0413
370/329

\* cited by examiner

*Primary Examiner* — Jaison Joseph
(74) *Attorney, Agent, or Firm* — Staas & Halsey LLP (57) ABSTRACT

An information transmission apparatus, an information detection apparatus and a transmitter is provided where serial numbers of information transport blocks are determined according to information indicating branch selection, so as to transmit information on the branch selection by using the serial numbers of information transport blocks. Hence, no additional transmission path needs to be provided, and the information on the branch selection may be simply and conveniently transmitted and a probability of wrongly determining the information indicating branch selection may be reduced, thereby efficiently improving performance of the system.

10 Claims, 6 Drawing Sheets

INFORMATION TRANSMISSION APPARATUS, INFORMATION DETECTION APPARATUS AND TRANSMITTER

CROSS-REFERENCE TO RELATED APPLICATIONS

This application relates to the subject matter of the Chinese patent application for invention, Application No. 201510100233.3, filed with Chinese State Intellectual Property Office on Mar. 6, 2015. The disclosure of this Chinese application is considered part of and is incorporated by reference in the disclosure of this application.

BACKGROUND

1. Field

The present disclosure relates to the field of communications, and in particular to an information transmission apparatus, an information detection apparatus and a transmitter.

2. Description of the Related Art

Multiple sub-carrier signals are adopted in the multicarrier modulation technique, in which data streams are divided into several sub-data streams, so that the sub-data streams have much lower transmission bit rates, and these data are used to modulate several subcarriers, respectively. Multicarrier modulation signals are characterized in having relatively low transmission rates of subcarrier data and relatively long periods of code elements. Multicarrier modulation may be realized in multiple technical ways, such as discrete multitone (DMT), and orthogonal frequency division multiplexing (OFDM), etc.

A problem existed in the multicarrier modulation signals is that their peak to average power ratios (PAPRs) are relatively high. In practical applications, a peak value of an output signal of a transmitter is often limited; hence, in order to increase average power of the signals, the PAPRs of the signals need to be lowered. One of the most often used methods is to perform clipping directly on the multicarrier modulation signals. The multicarrier modulation signals are formed by superimposing multiple subcarrier signals, hence, in some special bitmaps, extremely high PAPRs will occur. Clipping operations on these symbols of extremely high PAPRs will produce very large signal distortion, thereby resulting in burst errors in these symbols. Although a probability of occurrence of such burst errors is not high and its effect on an average bit error rate is relatively few, the burst errors will result in a failure of forward error correction (FEC) decoding, thereby causing a communication failure.

Figure 1:
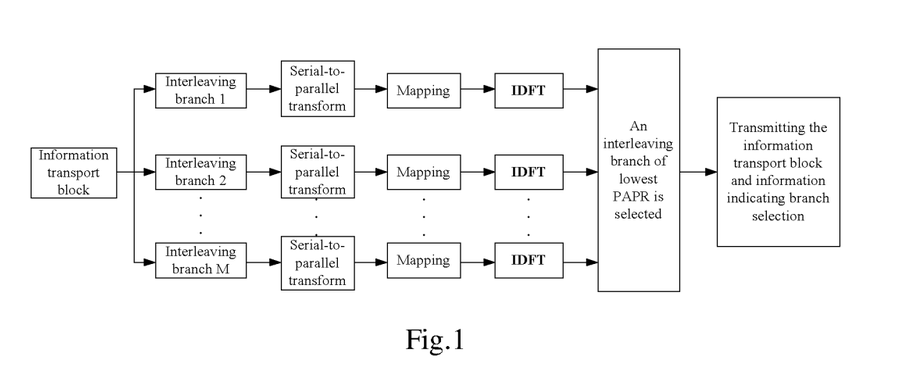
FIG. 1 is a flowchart of transmitting information transport blocks by an existing transmitter having multiple branches.

Currently, a transmitter may process information transport blocks to be transmitted via multiple interleaving branches or multiple phase disturbing branches respectively, and then perform serial-to-parallel transform, mapping and inverse discrete Fourier transform (IDFT) respectively, and finally select a branch of a lowest PAPR to transmit the information transport blocks. In such a case, the transmitter needs to notify information on the selected branch (often referred to as side information) to a receiver, and the receiver performs corresponding processing after receiving the information. In the following, the "information on the selected branch" is referred to as "information indicating branch selection". Following description is given taking an interleaving branch as an example. FIG. 1 is a flowchart of transmitting information transport blocks by an existing transmitter having multiple branches. As shown in FIG. 1, after an information transport block to be transmitted is interleaved by 1-M interleaving branches, performed serial-to-parallel transform and mapping respectively, and performed inverse discrete Fourier transform (IDFT), an interleaving branch of lowest PAPR is selected to transmit the information transport block, and furthermore, information on which interleaving branch is selected to transmit the information transport block is transmitted to a receiver. The information may be transmitted in multiple manners, such as directly selecting a subcarrier as a transmission path of the information, or directly interpolating a slot of the information into a time domain. A scheme of multiple phase disturbing branches is similar to what is described above, in which multiple interleaving branches are replaced with multiple phase disturbing branches, which shall not be described herein any further.

It should be noted that the above description of the background is merely provided for clear and complete explanation of the present disclosure and for easy understanding by those skilled in the art. And it should not be understood that the above technical solution is known to those skilled in the art as it is described in the background art of the present disclosure.

SUMMARY

When a transmitter uses the above method to transmit information indicating branch selection, an additional transmission path needs to be provided. And furthermore, at a receiving end, when the information indicating branch selection is wrongly determined, a result shall be disastrous. Hence, it is often needed to additionally set an error correction code for the information indicating branch selection, thereby increasing complexity, and needing extra overhead.

Embodiments of the present disclosure provide an information transmission apparatus, an information detection apparatus and a transmitter, in which the information indicating branch selection may be simply and conveniently transmitted and a probability of wrongly determining the information indicating branch selection may be reduced, thereby efficiently improving performance of the system.

According to a first aspect of embodiments of the present disclosure, there is provided an information transmission apparatus, including: a determining unit configured to determine serial numbers of information transport blocks to be transmitted; wherein, for each information transport block, the determining unit determines a serial number of a current information transport block according to information of the current information transport block indicating branch selection or according to information of the current information transport block indicating branch selection and a serial number of a former information transport block of the current information transport block; and a transmitting unit configured to transmit the information transport blocks containing the serial numbers.

According to a second aspect of embodiments of the present disclosure, there is provided an information detection apparatus, including: a receiving unit configured to receive information transport blocks; wherein, in transmitting each information transport block, a serial number of a current information transport block is determined according to information of the current information transport block indicating branch selection or according to information of the current information transport block indicating branch selection and a serial number of a former information transport block of the current information transport block; and a detecting unit configured to detect the information indicating branch selection of the information transport blocks according to the serial number of the received information transport blocks.

According to a third aspect of embodiments of the present disclosure, there is provided a transmitter, including the information transmission apparatus described in the first aspect of embodiments of the present disclosure.

An advantage of embodiments of the present disclosure exists in that serial numbers of information transport blocks are determined according to information indicating branch selection, so as to transmit information indicating branch selection by using the serial numbers of information transport blocks. Hence, no additional transmission path needs to be provided, and the information indicating branch selection may be simply and conveniently transmitted and a probability of wrongly determining the information indicating branch selection may be reduced, thereby efficiently improving performance of the system.

With reference to the following description and drawings, the particular embodiments of the present disclosure are disclosed in detail, and the principle of the present disclosure and the manners of use are indicated. It should be understood that the scope of embodiments of the present disclosure is not limited thereto. Embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 2:
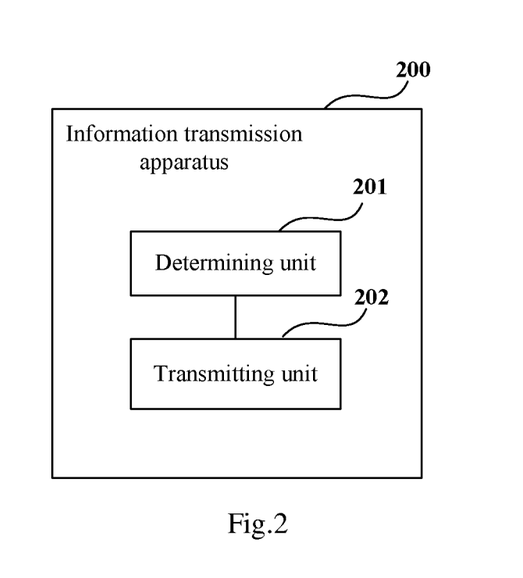
FIG. 2 is a schematic diagram of a structure of the information transmission apparatus of Embodiment 1 of the present disclosure.

FIG. 2 is a schematic diagram of a structure of the information transmission apparatus of Embodiment 1 of the present disclosure. As shown in FIG. 2, the apparatus 200 includes a determining unit 201 and a transmitting unit 202.

The determining unit 201 is configured to determine serial numbers of information transport blocks to be transmitted; for each information transport block, the determining unit determines a serial number of a current information transport block according to information of the current information transport block indicating branch selection or according to information of the current information transport block indicating branch selection and a serial number of a former information transport block of the current information transport block;

and the transmitting unit 202 is configured to transmit the information transport blocks containing the serial numbers.

It can be seen from the above embodiment that the serial numbers of the information transport blocks are determined according to the information indicating branch selection, so as to transmit information indicating branch selection by using the serial numbers of the information transport blocks. Hence, no additional transmission path needs to be provided, and the information indicating branch selection may be simply and conveniently transmitted and a probability of wrongly determining the information indicating branch selection may be reduced, thereby efficiently improving performance of the system.

In this embodiment, the apparatus may be provided at a transmitter side, and is applicable to a scenario where information transport blocks needing to be transmitted select multiple branches respectively. The branches may be, for example, interleaving branches, or phase disturbing branches, etc., and functions of the multiple branches are not limited in this embodiment.

In this embodiment, the information transport blocks may be information transport blocks in any form. For example, information transport blocks are forward error correction (FEC) coding blocks. And types of information transport blocks are not limited in this embodiment.

Figure 3:
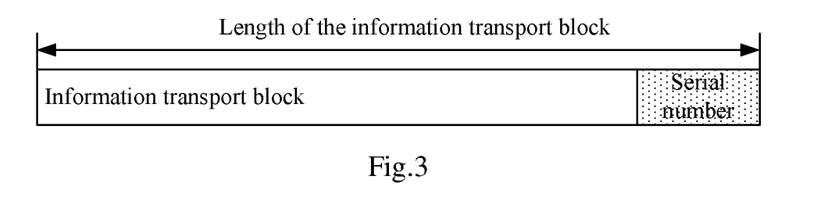
FIG. 3 is a schematic diagram of a structure of the information transport block of Embodiment 1 of the present disclosure.

FIG. 3 is a schematic diagram of a structure of the information transport block of this embodiment. As shown in FIG. 3, in order to meet a demand of hardware processing, an information transport block may be filled with some vacancies, so that a length of the information transport block is an integral multiple of 8 bits, such as 128 bits. For example, the filled vacancies may be used to set a serial number of the information transport block and are transmitted to a receiver side along with the information transport block.

In this embodiment, the transmission signal may include multiple information transport blocks, and the multiple information transport blocks may be transmitted in turn according to their respective serial numbers. For example, when the serial numbers of the information transport blocks arranged in orders have been pre-generated and are interpolated into the information transport blocks, for each of the information transport blocks, the determining unit 201 may determine the serial number of the current information transport block according to the information indicating branch selection of the current the information transport block; and when the serial numbers of the information transport blocks arranged in orders have not been pre-generated, the determining unit 201 may determine the serial number of the current information transport block according to the information indicating branch selection of the current the information transport block and a serial number of an information transport block preceding the current information transport block.

In this embodiment, the information indicating branch selection is information indicating whether a branch selected for transmitting the current information transport block is changed relative to a branch transmitting a preceding information transport block, or the information indicating branch selection is information on which branch is selected, that is, the serial number of the branch selected for transmitting the current information transport block.

Following description shall be illustrated taking that the serial numbers of the information transport blocks arranged in orders have not been pre-generated as an example.

Figure 4:
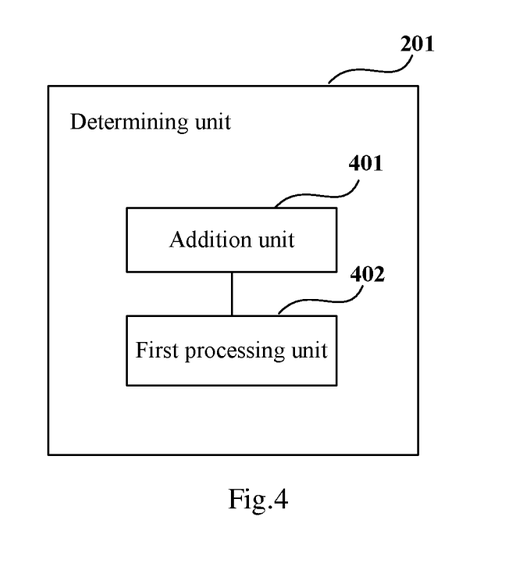
FIG. 4 is a schematic diagram of a structure of the determining unit 201 of Embodiment 1 of the present disclosure.

FIG. 4 is a schematic diagram of a structure of the determining unit 201 of this embodiment. As shown in FIG. 4, the determining unit 201 includes:

an addition unit 401 configured to add a predefined value to the serial number of the former information transport block of the current information transport block, and take the serial number added with the predefined value as the serial number of the current information transport block when a branch selected for transmitting the current information transport block is not changed relative to a branch for transmitting the former information transport block; and a first processing unit 402 configured to process the serial number added with the predefined value when the branch selected for transmitting the current information transport block is changed relative to the branch for transmitting the former information transport block, and take the processed serial number as the serial number of the current information transport block.

In this embodiment, a judging unit (not shown) may further be provided, which is configured to judge whether the branch selected for transmitting the current information transport block is changed relative to a branch for transmitting a former information transport block. The judging unit may be provided in the determining unit 201, and may also be provided in the apparatus 200 as an independent component.

In this embodiment, selecting the branch for transmitting the information transport block may use an existing method. For example, a branch making a peak to average power ratio lowest may be selected, or a branch 1 may be selected by default. When a peak to average power ratio of the branch 1 is greater than a predefined threshold value, it is switched to a branch 2.

Figure 5:
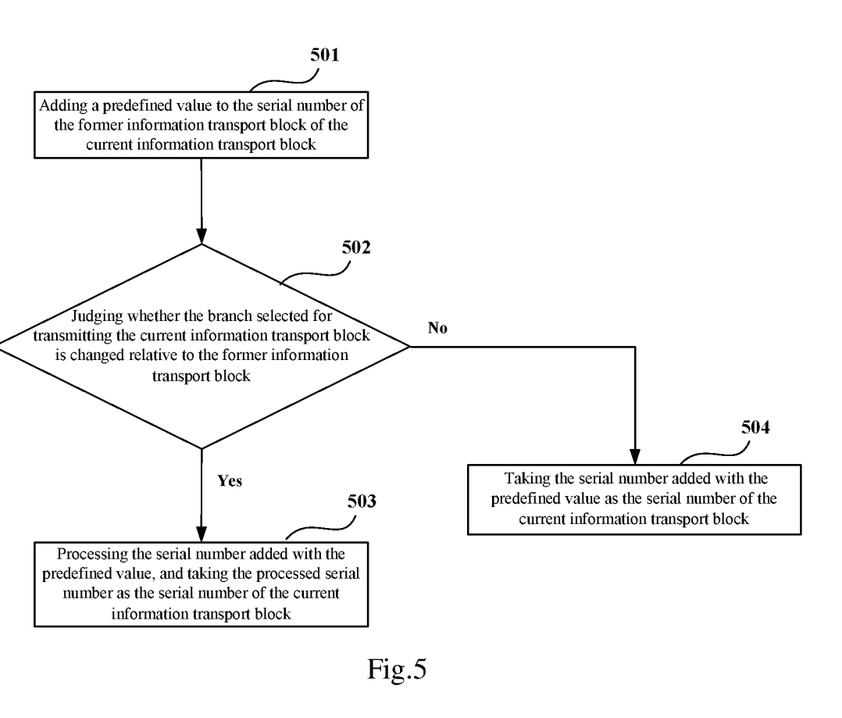
FIG. 5 is a flowchart of the method for determining a serial number of a current information transport block of Embodiment 1 of the present disclosure.

FIG. 5 is a flowchart of the method for determining the serial number of the current information transport block of this embodiment. As shown in FIG. 5, the method includes:

Step 501: adding a predefined value to the serial number of the former information transport block of the current information transport block;

Step 502: judging whether the branch selected for transmitting the current information transport block is changed relative to the branch for transmitting the former information transport block, entering into step 503 when it is changed, and entering into step 504 when it is not changed;

Step 503: processing the serial number added with the predefined value, and taking the processed serial number as the serial number of the current information transport block; and Step 504: taking the serial number added with the predefined value as the serial number of the current information transport block.

In this embodiment, the addition unit 401 is configured to add the predefined value to the serial number of the former information transport block of the current information transport block, such as adding 1 to the serial number of the former information transport block, and directly take the serial number added with the predefined value as the serial number of the current information transport block when the branch selected for transmitting the current information transport block is not changed relative to the branch for transmitting the former information transport block. That is, when the branch selected for transmitting the current information transport block is not changed relative to the branch for transmitting the former information transport block, the serial number of the current information transport block is a serial number arranged in order.

In this embodiment, the predefined value may be defined according to an actual situation, and a numerical value of the predefined value is not limited in this embodiment.

In this embodiment, the serial number of the former information transport block refers to a serial number of the former information transport block arranged in order, that is, a serial number not processed by the first processing unit 402.

In this embodiment, the first processing unit 402 is configured to process the serial number added with the predefined value when the branch selected for transmitting the current information transport block is changed relative to the branch for transmitting the former information transport block, and take the processed serial number as the serial number of the current information transport block. That is, when the branch selected for transmitting the current information transport block is changed relative to the branch for transmitting the former information transport block, the first processing unit 402 processes the serial number arranged in order and then take it as the serial number of the current information transport block.

In this embodiment, the processing of the serial number added with the predefined value by the first processing unit 402 may be, for example, performing inversion processing on the whole or a part of the serial number added with the predefined value, and taking the inversion processed serial number as the serial number of the current information transport block.

In this embodiment, by performing inversion processing on the whole or a part of the serial number added with the predefined value, an original rule of arranging in order may be intensely destroyed, thereby outstandingly expressing the information indicating branch selection. Hence, the information indicating branch selection may be easily detected at the receiver side, and a probability of wrongly determining the information indicating branch selection may be reduced.

In this embodiment, the first processing unit 402 may perform inversion processing on the whole serial number added with the predefined value. For example, a serial number of an information transport block may be denoted by a binary system of 4 bits, and a serial number added with a predefined value "1" is "0110"; and when the branch selected for transmitting the current information transport block is changed relative to the branch for transmitting the former information transport block, the first processing unit 402 may directly perform inversion processing on the whole serial number, the processed serial number being "1001".

In this embodiment, the first processing unit 402 may perform inversion processing on a part of the serial number added with the predefined value, the "part" being any part of the serial number. For example, when the serial number of the branch selected for transmitting the current information transport block is a serial number of the branch of the former information transport block of the current information transport block added with or subtracted by different predefined values, inversion is performed on a former half bit or a latter half bit of the serial number added with the predefined value, or inversion is performed on both a former half bit and a latter half bit of the serial number added with the predefined value.

In this embodiment, the predefined value may be defined according to an actual situation, and a numerical value of the predefined value is not limited in this embodiment.

For example, a serial number of an information transport block may be denoted by a binary system of 4 bits, a serial number of the former information transport block is "0101", and after it is added with a predefined value "1", the serial number is "0110".

When the serial number of the branch selected for transmitting the current information transport block is the serial number of the branch of the former information transport block of the current information transport block added with 1, inversion is performed on a former half bit of "0110", and its latter half bit is unchanged, with a processed serial number being "1010".

When the serial number of the branch selected for transmitting the current information transport block is the serial number of the branch of the former information transport block of the current information transport block added with 2, inversion is performed on the latter half bit of "0110", and its former half bit is unchanged, with a processed serial number being "0101".

When the serial number of the branch selected for transmitting the current information transport block is the serial number of the branch of the former information transport block of the current information transport block added with 3, inversion is performed on both the former half bit and latter half bit of "0110", with a processed serial number being "1001".

In this embodiment, the determining unit 201 may directly determine the serial number of the current information transport block according to the serial number of the branch selected for transmitting the current information transport block and the serial number of the branch for transmitting the former information transport block.

For example, a serial number of an information transport block may be denoted by a binary system of 4 bits, a serial number of the former information transport block is "0101", after it is added with a predefined value "1", the serial number is "0110", and a branch that may be selected for transmitting the information transport block may be branches 1-4;

when the branch selected for transmitting the current information transport block is the branch 1, the serial number "0110" directly added with the predefined value "1" is taken as the serial number of the current information transport block;

when the branch selected for transmitting the current information transport block is the branch 2, inversion is performed on the former half bit of the serial number "0110" added with the predefined value "1", and its latter half bit is unchanged, with a processed serial number being "1010";

when the branch selected for transmitting the current information transport block is the branch 3, inversion is performed on the latter half bit of the serial number "0110" added with the predefined value "1", and its former half bit is unchanged, with a processed serial number being "0101";

and when the branch selected for transmitting the current information transport block is the branch 4, inversion is performed on the former half bit of the serial number "0110" added with the predefined value "1", and inversion is also performed on its latter half bit, with a processed serial number being "1001".

What illustrated above takes that the serial numbers of the information transport blocks arranged in orders have not been pre-generated as an example. Following description shall be illustrated taking that the serial numbers of the information transport blocks arranged in orders have been pre-generated and are interpolated into the information transport blocks.

Figure 6:
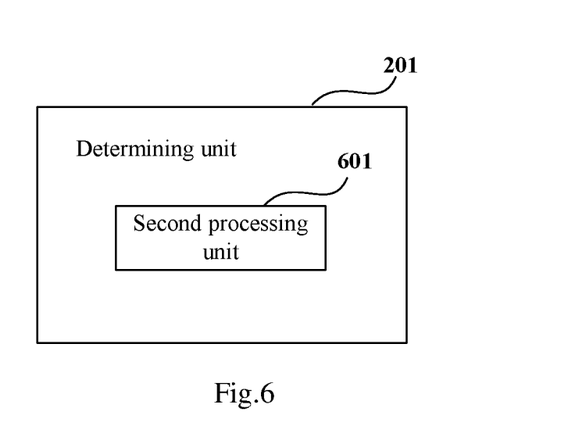
FIG. 6 is another schematic diagram of a structure of the determining unit 201 of Embodiment 1 of the present disclosure.

FIG. 6 is another schematic diagram of a structure of the determining unit 201 of this embodiment. As shown in FIG. 6, the determining unit 201 includes:

a second processing unit 601 configured to process the serial number of the current information transport block when the branch selected for transmitting the current information transport block is changed relative to the branch for transmitting the former information transport block, and take the processed serial number as the serial number of the current information transport block.

In this embodiment, a judging unit (not shown) may further be provided, which is configured to judge whether the branch selected for transmitting the current information transport block is changed relative to the branch for transmitting a former information transport block. The judging unit may be provided in the determining unit 201, and may also be provided in the apparatus 200 as an independent component.

In this embodiment, the processing of the serial number of the current information transport block by the second processing unit 601 may be, for example, performing inversion processing on the whole or a part of the serial number of the current information transport block, and taking the inversion processed serial number as the serial number of the current information transport block.

In this embodiment, as the serial numbers arranged in order have been pre-generated and are interpolated into the information transport blocks, the determining unit 201 needs not to provide an addition unit, and a method for processing the serial number of the current information transport block by the second processing unit 601 is identical to the method for processing the serial number added with the predefined value by the first processing unit 402, which shall not be described herein any further.

In this embodiment, the transmitting unit 202 transmits the information transport block containing the serial number. Wherein, the information transport block may be transmitted via an existing transmission path. Hence, no additional transmission path is needed to be provided to transmit the information indicating branch selection.

It can be seen from the above embodiment that serial numbers of information transport blocks are determined according to information indicating branch selection, so as to transmit information indicating branch selection by using the serial numbers of information transport blocks. Hence, no additional transmission path needs to be provided, and the information indicating branch selection may be simply and conveniently transmitted and a probability of wrongly determining the information indicating branch selection may be reduced, thereby efficiently improving performance of the system.

Embodiment 2

Figure 7:
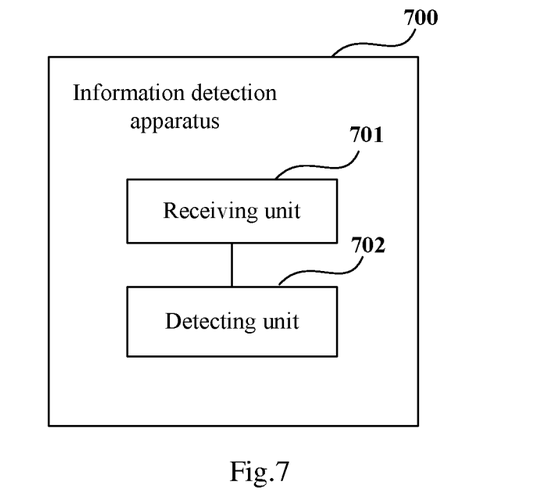
FIG. 7 is a schematic diagram of a structure of the information detection apparatus of Embodiment 2 of the present disclosure.

An embodiment of the present disclosure provides an information detection apparatus, provided at a receiver side. FIG. 7 is a schematic diagram of a structure of the information detection apparatus of Embodiment 2 of the present disclosure. As shown in FIG. 7, the apparatus 700 includes: a receiving unit 701 and a detecting unit 702; wherein, the receiving unit 701 is configured to receive information transport blocks; wherein, in transmitting each information transport block, a serial number of a current information transport block is determined according to information of the current information transport block indicating branch selection or according to information of the current information transport block indicating branch selection and a serial number of a former information transport block of the current information transport block;

and the detecting unit 702 is configured to detect the information indicating branch selection of the information transport blocks according to the serial number of the received information transport blocks.

In this embodiment, the receiving unit 701 receives the information transport blocks transmitted by the information transmission apparatus 200 of Embodiment 1, and the detecting unit 702 detects the information indicating branch selection of the information transport blocks according to the serial number of the received information transport blocks.

In this embodiment, for example, the detecting unit 702 may detect the information indicating branch selection of the information transport blocks according to a code distance between the serial number of the received information transport block and the serial number of the information transport block before transmission, and a code distance between the serial number of the received information transport block and a processed serial number of the information transport block before transmission.

In this embodiment, the serial number of the information transport block before transmission refers to an unprocessed serial number of the information transport block arranged in order at the transmission end, that is, a serial number arranged in an order of transmitting information transport blocks; and the processed serial number of the information transport block before transmission refers to a serial number obtained after various possible processing performed on the serial number of the information transport block corresponding to various variations or the serial numbers of the branches.

For example, the detecting unit 702 may compare the code distance between the serial number of the received information transport block and the serial number of the information transport block before transmission, and the code distance between the serial number of the received information transport block and the processed serial number of the information transport block before transmission, when the code distance between the serial number of the received information transport block and the serial number of the information transport block before transmission is relatively small, it is judged that the selected branch for transmitting the information transport block is identical to the branch for transmitting the former information transport block, and when the code distance between the serial number of the received information transport block and the processed serial number of the information transport block before transmission is relatively small, it is judged that the selected branch for transmitting the information transport block is changed relative to the branch for transmitting the former information transport block, and which of the branches is the selected branch for transmitting the information transport block is also judged.

In this embodiment, the detecting unit 702 may detect a change of the branch selected for transmitting the received information transport block relative to the branch for transmitting the former information transport block according to a rule for determining serial numbers of the determining unit 201 in Embodiment 1.

For example, as described in Embodiment 1, when the serial number of the branch selected for transmitting the current information transport block is the serial number of the branch of the former information transport block of the current information transport block added with 1, inversion is performed on a former half bit, and its latter half bit is unchanged, after the serial number of the former information transport block is added with 1; when the serial number of the branch selected for transmitting the current information transport block is the serial number of the branch of the former information transport block of the current information transport block added with 2, inversion is performed on the latter half bit, and its former half bit is unchanged, after the serial number of the former information transport block is added with 1; and when the serial number of the branch selected for transmitting the current information transport block is the serial number of the branch of the former information transport block of the current information transport block added with 3, inversion is performed on the former half bit and latter half bit, after the serial number of the former information transport block is added with 1. According to this rule, the detection unit 702 compares code distances between the serial number of the received information transport block and the serial number of the former information transport block added with 1, with its former half bit being performed inversion and its latter half bit being unchanged, the serial number of the former information transport block added with 1, with its latter half bit being performed inversion and its former half bit being unchanged, and the serial number of the former information transport block added with 1, with both its former half bit and latter half bit being performed inversion, so as to judge a change of the branch selected for transmitting the received information transport block relative to the branch for transmitting the former information transport block according to a manner of processing to which a relatively small code distance corresponds.

In this embodiment, the detecting unit 702 may detect the serial number of the branch selected for transmitting the received information transport block according to a rule for determining serial numbers of the determining unit 201 in Embodiment 1.

For example, as described in Embodiment 1, when the branch selected for transmitting the current information transport block is the branch 1, the serial number of the former information transport block is directly added with 1 and then taken as the serial number of the current information transport block; when the branch selected for transmitting the current information transport block is the branch 2, inversion is performed on the former half bit of the serial number, and its latter half bit is unchanged, after the serial number of the former information transport block is added with 1; when the branch selected for transmitting the current information transport block is the branch 3, inversion is performed on the latter half bit of the serial number, and its former half bit is unchanged, after the serial number of the former information transport block is added with 1; and when the branch selected for transmitting the current information transport block is the branch 4, inversion is performed on both the former half bit and latter half bit of the serial number, after the serial number of the former information transport block is added with 1. According to this rule, the detection unit 702 compares code distances between the serial number of the received information transport block and the serial number of the former information transport block added with 1, the serial number of the former information transport block added with 1, with its former half bit being performed inversion and its latter half bit being unchanged, the serial number of the former information transport block added with 1, with its latter half bit being performed inversion and its former half bit being unchanged, and the serial number of the former information transport block added with 1, with both its former half bit and latter half bit being performed inversion, so as to judge the serial number of the branch selected for transmitting the received information transport block according to a manner of processing to which a relatively small code distance corresponds.

The above description is illustrated taking that the serial numbers of the information transport blocks arranged in orders have not been pre-generated as an example. And when the serial numbers of the information transport blocks arranged in orders at the transmitter end have been pre-generated and interpolated into the information transport blocks, the detecting unit 702 may also perform similar detection, with a manner of processing corresponding to what is described in Embodiment 1, which shall not be described herein any further.

It can be seen from the above embodiment that the information indicating branch selection of the information transport block may be detected by detecting the code distances at a receiver side between the serial number of the information transport block and the serial number of the former information transport block and the processed serial number of the information transport block before transmission, thereby reducing a probability of wrongly determining the information indicating branch selection, and efficiently improving performance of the system.

Embodiment 3

An embodiment of the present disclosure further provides a transmitter, including an information transmission apparatus, a structure and functions of the information transmission apparatus being identical to those described in Embodiment 1, which shall not be described herein any further.

Figure 8:
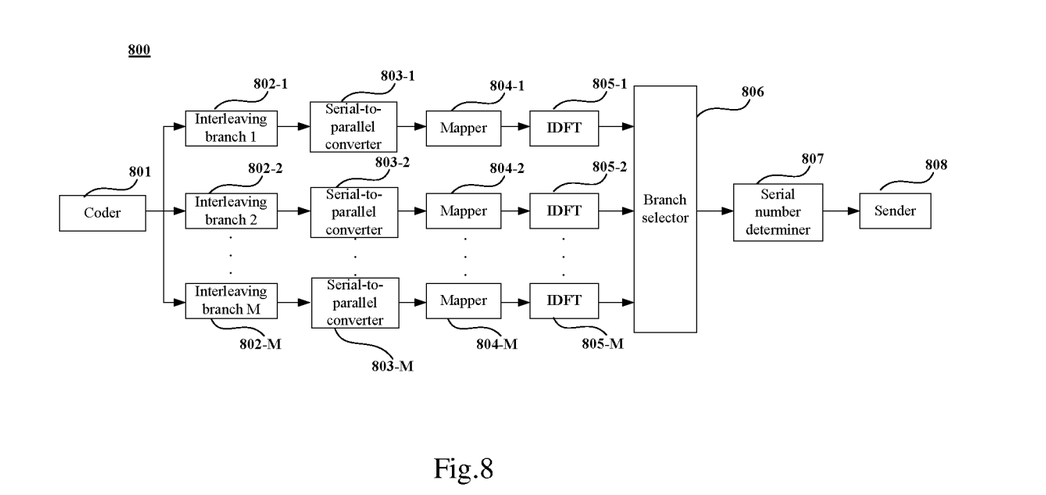
FIG. 8 is a block diagram of a systematic structure of the transmitter of Embodiment 3 of the present disclosure.

FIG. 8 is a block diagram of a systematic structure of the transmitter of Embodiment 3 of the present disclosure. As shown in FIG. 8, the transmitter 800 includes a coder 801, M interleaving branches 1~M (802-1~802-M), M serial-to-parallel converters 803-1~803-M, M mappers 804-1~804-M, M inverse discrete Fourier transformers (IDFTs) 805-1~805-M, a branch selector 806, a serial number determiner 807, and a sender 808, M being an integer greater than or equal to 2. In this embodiment, an information transport block needing to be transmitted enters into the M interleaving branches respectively after being coded by the coder 801, then is subjected to serial-to-parallel conversion by the serial-to-parallel converters, mapping by the mappers and inverse discrete Fourier transform by the IDFTs; then, the branch selector 806 selects an interleaving branch for transmitting the information transport block, and a method in the prior art may be used for selecting the interleaving branch; for example, a branch making a peak to average power ratio lowest may be selected, or a branch 1 may be selected by default, wherein when a peak to average power ratio of the branch 1 is greater than a predefined threshold value, it is switched to a branch 2; the branch selector 806 inputs the information transport block and information indicating branch selection into the serial number determiner 807, the serial number determiner 807 determines a serial number of the information transport block according to the information indicating branch selection, or according to the information indicating branch selection and a serial number of a former information transport block; and the sender 808 sends the information transport block containing the serial number to a transmission path for transmission.

In this embodiment, the serial number determiner 807 corresponds to the determining unit 201 in Embodiment 1, and the sender 808 corresponds to the transmitting unit 202 in Embodiment 1, and these components have the same structures and functions as those of the corresponding components in Embodiment 1, which shall not be described herein any further.

In this embodiment, when the serial numbers of the information transport blocks arranged in orders have not been pre-generated, the serial number determiner 807 determines the serial number of the information transport block according to the information indicating branch selection and the serial number of the former information transport block, and interpolate it into the information transport block; and when the serial numbers of the information transport blocks arranged in orders have been pre-generated and interpolated into the information transport blocks, the serial number determiner 807 determines whether it is needed to process the generated serial numbers according to the information indicating branch selection, and takes a processed serial number as the serial number of the information transport block when processing is needed.

It can be seen from the above embodiment that the serial number of the information transport block is determined according to the information indicating branch selection, so as to transmit the information indicating branch selection by using the serial number of the information transport block. Hence, no additional transmission path needs to be provided, and the information indicating branch selection may be simply and conveniently transmitted and a probability of wrongly determining the information indicating branch selection may be reduced, thereby efficiently improving performance of the system.

Embodiment 4

An embodiment of the present disclosure further provides a receiver, including an information detection apparatus, a structure and functions of the information detection apparatus being identical to those described in Embodiment 2, which shall not be described herein any further.

Figure 9:
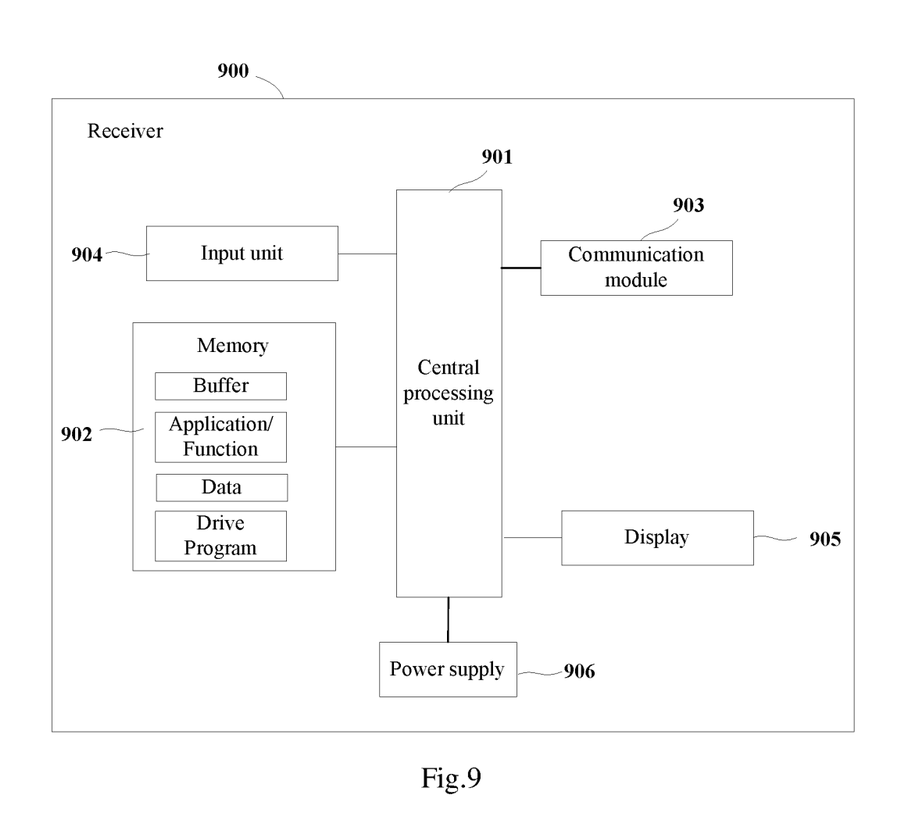
FIG. 9 is a block diagram of a systematic structure of the receiver of Embodiment 4 of the present disclosure.

FIG. 9 is a block diagram of a systematic structure of the receiver of Embodiment 4 of the present disclosure. As shown in FIG. 9, the receiver 900 may include a central processing unit 901 and a memory 902, the memory 902 being coupled to the central processing unit 901. This figure is exemplary only, and other types of structures may be used to supplement or replace this structure for the realization of telecommunications functions or other functions.

As shown in FIG. 9, the receiver 900 may further include a communication module 903, an input unit 904, a display 905, and a power supply 906.

In an implementation, functions of the information detection apparatus may be integrated into the central processing unit 901. Wherein, the central processing unit 901 may be configured to receive information transport blocks; wherein, in transmitting each information transport block, a serial number of a current information transport block is determined according to information of the current information transport block indicating branch selection or according to information of the current information transport block indicating branch selection and a serial number of a former information transport block of the current information transport block; and detect the information indicating branch selection of the information transport blocks according to the serial number of the received information transport blocks.

In this embodiment, the detecting the information indicating branch selection of the information transport blocks according to the serial number of the received information transport blocks includes: detecting the information indicating branch selection of the information transport blocks according to a code distance between the serial number of the received information transport block and a serial number of the information transport block before transmission, and a code distance between the serial number of the received information transport block and a processed serial number of the information transport block before transmission.

In another implementation, the information detection apparatus and the central processing unit 901 may be configured separately. For example, the information detection apparatus may be configured as a chip connected to the central processing unit 901, with functions of the information detection apparatus being realized under control of the central processing unit 901.

In this embodiment, the receiver 900 does not necessarily include all the parts shown in FIG. 9.

As shown in FIG. 9, the central processing unit 901 is sometimes referred to as a controller or control, and may include a microprocessor or other processor devices and/or logic devices. The central processing unit 901 receives input and controls operations of every components of the receiver 900.

The memory 902 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 901 may execute the program stored in the memory 902, so as to realize information storage or processing, etc. Functions of other parts are similar to those of the prior art, which shall not be described herein any further. The parts of the receiver 900 may be realized by specific hardware, firmware, software, or any combination thereof, without departing from the scope of the present disclosure.

It can be seen from the above embodiment that the information indicating branch selection of the information transport block may be detected by detecting the code distances between the serial number of the information transport block and the serial number of the former information transport block and the processed serial number of the information transport block before transmission, thereby reducing a probability of wrongly determining the information indicating branch selection, and efficiently improving performance of the system.

Embodiment 5

Figure 10:
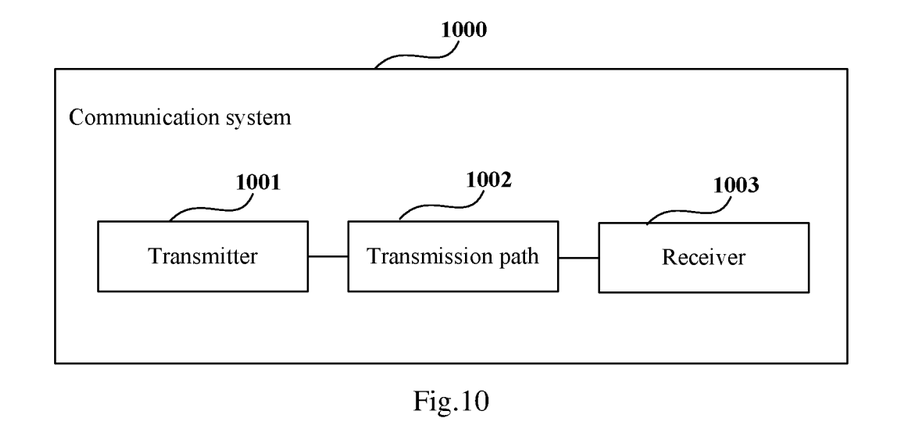
FIG. 10 is a schematic diagram of a structure of the communication system of Embodiment 5 of the present disclosure.

An embodiment of the present disclosure further provides a communication system. FIG. 10 is a schematic diagram of a structure of the communication system of this embodiment. As shown in FIG. 10, the communication system 1000 includes a transmitter 1001, a transmission path 1002 and a receiver 1003. In this embodiment, a structure and functions of the transmitter 1001 are identical to those described in Embodiment 3, and a structure and functions of the receiver 1002 are identical to those described in Embodiment 4, which shall not be described herein any further. The transmission path 1002 may have a structure and functions of an existing transmission path, and a structure and functions of the transmission path are not limited in this embodiment of the present disclosure.

It can be seen from the above embodiment that the serial number of the information transport block is determined according to the information indicating branch selection, so as to transmit the information indicating branch selection by using the serial number of the information transport block. Hence, no additional transmission path needs to be provided, and the information indicating branch selection may be simply and conveniently transmitted and a probability of wrongly determining the information indicating branch selection may be reduced, thereby efficiently improving performance of the system.

Embodiment 6

Figure 11:
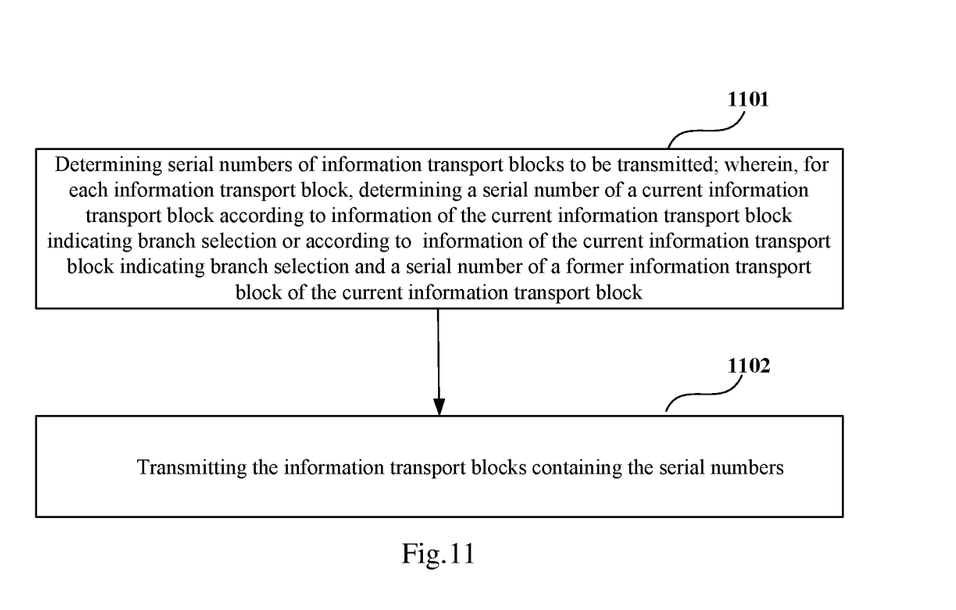
FIG. 11 is a flowchart of the information transmission method of Embodiment 6 of the present disclosure.

An embodiment of the present disclosure further provides an information transmission method, corresponding to the information transmission apparatus of Embodiment 1. FIG. 11 is a flowchart of the information transmission method of this embodiment. As shown in FIG. 11, the method includes:

Step 1101: determining serial numbers of information transport blocks to be transmitted; wherein, for each information transport block, determining a serial number of a current information transport block according to information of the current information transport block indicating branch selection or according to information of the current information transport block indicating branch selection and a serial number of a former information transport block of the current information transport block; and Step 1102: Transmitting the Information Transport Blocks Containing the Serial Numbers.

In this embodiment, the method for determining the serial numbers of the information transport blocks and the method for transmitting the information transport blocks containing the serial numbers are identical to those described in Embodiment 1, which shall not be described herein any further.

It can be seen from the above embodiment that the serial number of the information transport block is determined according to the information indicating branch selection, so as to transmit the information indicating branch selection by using the serial number of the information transport block. Hence, no additional transmission path needs to be provided, and the information indicating branch selection may be simply and conveniently transmitted and a probability of wrongly determining the information indicating branch selection may be reduced, thereby efficiently improving performance of the system.

Embodiment 7

Figure 12:
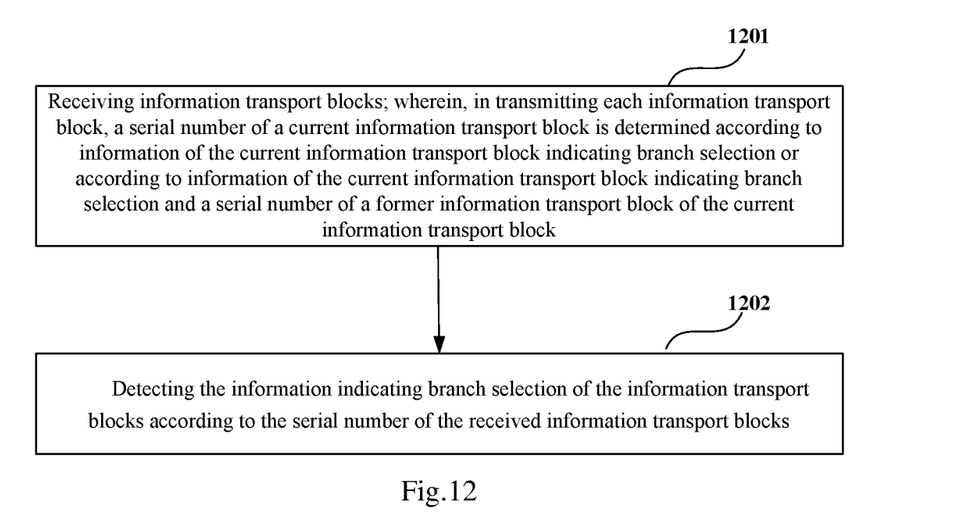
FIG. 12 is a flowchart of the information detection method of Embodiment 7 of the present disclosure.

An embodiment of the present disclosure further provides an information detection method, corresponding to the information detection apparatus of Embodiment 2. FIG. 12 is a flowchart of the information detection method of this embodiment. As shown in FIG. 12, the method includes:

Step 1201: receiving information transport blocks; wherein, in transmitting each information transport block, a serial number of a current information transport block is determined according to information of the current information transport block indicating branch selection or according to information of the current information transport block indicating branch selection and a serial number of a former information transport block of the current information transport block; and Step 1202: detecting the information indicating branch selection of the information transport blocks according to the serial number of the received information transport blocks.

In this embodiment, the method for receiving the information transport blocks and the method for detecting the information indicating branch selection of the information transport blocks are identical to those described in Embodiment 2, which shall not be described herein any further.

It can be seen from the above embodiment that the information indicating branch selection of the information transport block may be detected by detecting the code distances at a receiver side between the serial number of the information transport block and the serial number of the former information transport block and the processed serial number of the information transport block before transmission, thereby reducing a probability of wrongly determining the information indicating branch selection, and efficiently improving performance of the system.

An embodiment of the present disclosure further provides a computer-readable program, wherein when the program is executed in an information transmission apparatus or a transmitter, the program enables the computer to carry out the information transmission method as described in Embodiment 6 in the information transmission apparatus or the transmitter.

An embodiment of the present disclosure further provides a computer-readable program, wherein when the program is executed in an information detection apparatus or a receiver, the program enables the computer to carry out the information detection method as described in Embodiment 7 in the information detection apparatus or the receiver.

An embodiment of the present disclosure further provides a storage medium in which a computer-readable program is stored, wherein the computer-readable program enables the computer to carry out the information transmission method as described in Embodiment 6 in an information transmission apparatus or a transmitter.

An embodiment of the present disclosure further provides a storage medium in which a computer-readable program is stored, wherein the computer-readable program enables the computer to carry out the information detection method as described in Embodiment 7 in an information detection apparatus or a receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

For the implementation of the present disclosure containing the above embodiments, following supplements are further disclosed.

Supplement 1. An information transmission apparatus, including:

a determining unit configured to determine serial numbers of information transport blocks to be transmitted; wherein, for each information transport block, the determining unit determines a serial number of a current information transport block according to information of the current information transport block indicating branch selection or according to information of the current information transport block indicating branch selection and a serial number of a former information transport block of the current information transport block; and a transmitting unit configured to transmit the information transport blocks containing the serial numbers.

Supplement 2. The apparatus according to supplement 1, wherein the determining unit includes:

an addition unit configured to add a predefined value to the serial number of the former information transport block of the current information transport block, and take the serial number added with the predefined value as the serial number of the current information transport block when a branch selected for transmitting the current information transport block is not changed relative to a branch for transmitting the former information transport block; and a first processing unit configured to process the serial number added with the predefined value when the branch selected for transmitting the current information transport block is changed relative to the branch for transmitting the former information transport block, and take the processed serial number as the serial number of the current information transport block.

Supplement 3. The apparatus according to supplement 2, wherein the first processing unit is configured to perform inversion processing on the whole or a part of the serial number added with the predefined value when the branch selected for transmitting the current information transport block is changed relative to the branch for transmitting the former information transport block, and take the inversion processed serial number as the serial number of the current information transport block.

Supplement 4. The apparatus according to supplement 3, wherein the branch selected for transmitting the current information transport block being changed relative to the branch for transmitting the former information transport block refers to that a serial number of the branch selected for transmitting the current information transport block is a serial number of the branch for transmitting the former information transport block of the current information transport block added with or subtracted by different predefined values; and the processing the serial number added with the predefined value by the processing unit includes: inverting former half bits or latter half bits of the serial number added with the predefined value, or inverting former half bits and latter half bits of the serial number added with the predefined value.

Supplement 5. The apparatus according to supplement 1, wherein the determining unit includes:

a second processing unit configured to process the serial number of the current information transport block when a branch selected for transmitting the current information transport block is changed relative to a branch for transmitting the former information transport block, and take the processed serial number as the serial number of the current information transport block.

Supplement 6. The apparatus according to supplement 5, when the branch selected for transmitting the current information transport block is changed relative to the branch for transmitting the former information transport block, the second processing unit performs inversion processing on the whole or a part of the serial number of the current information transport block, and takes the inversion processed serial number as the serial number of the current information transport block.

Supplement 7. The apparatus according to supplement 6, when the serial number of the branch selected for transmitting the current information transport block is a serial number of the branch for transmitting the former information transport block added with or subtracted by different predefined values, the second processing unit performs inversion on a former half bit or a latter half bit of the serial number of the current information transport block, or performs inversion on both a former half bit and a latter half bit of the serial number of the current information transport block.

Supplement 8. The apparatus according to supplement 1, wherein the information indicating branch selection is a serial number of a branch selected for transmitting the information transport block.

Supplement 9. The apparatus according to supplement 1, wherein the information transport block is an error correction coding block.

Supplement 10. An information detection apparatus, including:

a receiving unit configured to receive information transport blocks; wherein, in transmitting each information transport block, a serial number of a current information transport block is determined according to information of the current information transport block indicating branch selection or according to information of the current information transport block indicating branch selection and a serial number of a former information transport block of the current information transport block; and a detecting unit configured to detect the information indicating branch selection of the information transport blocks according to the serial number of the received information transport blocks.

Supplement 11. The apparatus according to supplement 10, wherein the detecting unit detects the information indicating branch selection of the information transport blocks according to a code distance between the serial number of the received information transport block and a serial number of the information transport block before transmission, and a code distance between the serial number of the received information transport block and a processed serial number of the information transport block before transmission.

Supplement 12. A transmitter, including the apparatus as described in any one of supplements 1-9.

Supplement 13. A receiver, including the apparatus as described in supplement 10 or Supplement 14. A communication system, including the transmitter as described in supplement 12 and the receiver as described in supplement 13.

Supplement 15. An information transmission method, including:

determining serial numbers of information transport blocks to be transmitted; wherein, for each information transport block, determining a serial number of a current information transport block according to information of the current information transport block indicating branch selection or according to information of the current information transport block indicating branch selection and a serial number of a former information transport block of the current information transport block; and transmitting the information transport blocks containing the serial numbers.

Supplement 16. The method according to supplement 15, wherein the determining a serial number of a current information transport block according to information of the current information transport block indicating branch selection and a serial number of a former information transport block of the current information transport block includes:

adding a predefined value to the serial number of the former information transport block of the current information transport block;

taking the serial number added with the predefined value as the serial number of the current information transport block when a branch selected for transmitting the current information transport block is not changed relative to a branch for transmitting the former information transport block; and processing the serial number added with the predefined value when the branch selected for transmitting the current information transport block is changed relative to the branch for transmitting the former information transport block, and taking the processed serial number as the serial number of the current information transport block.

Supplement 17. The method according to supplement 16, wherein the processing the serial number added with the predefined value when the branch selected for transmitting the current information transport block is changed relative to the branch for transmitting the former information transport block includes:

performing inversion processing on the whole or a part of the serial number added with the predefined value when the branch selected for transmitting the current information transport block is changed relative to the branch for transmitting the former information transport block.

Supplement 18. The method according to supplement 17, wherein the performing inversion processing on the whole or a part of the serial number added with the predefined value when the branch selected for transmitting the current information transport block is changed relative to the branch for transmitting the former information transport block includes:

performing inversion on a former half bit or a latter half bit of the serial number added with the predefined value, or performing inversion on both a former half bit and a latter half bit of the serial number added with the predefined value, when the serial number of the branch selected for transmitting the current information transport block is a serial number of the branch for transmitting the former information transport block added with or subtracted by different predefined values.

Supplement 19. The method according to supplement 15, wherein the determining a serial number of a current information transport block according to information of the current information transport block indicating branch selection includes:

processing the serial number of the current information transport block when a branch selected for transmitting the current information transport block is changed relative to a branch for transmitting the former information transport block, and taking the processed serial number as the serial number of the current information transport block.

Supplement 20. The method according to supplement 19, wherein the processing the serial number of the current information transport block when the branch selected for transmitting the current information transport block is changed relative to the branch for transmitting the former information transport block, and taking the processed serial number as the serial number of the current information transport block, includes:

performing inversion processing on the whole or a part of the serial number of the current information transport block when the branch selected for transmitting the current information transport block is changed relative to the branch for transmitting the former information transport block, and taking the inversion processed serial number as the serial number of the current information transport block.

Supplement 21. The method according to supplement 20, wherein the performing inversion processing on the whole or a part of the serial number of the current information transport block when the branch selected for transmitting the current information transport block is changed relative to the branch for transmitting the former information transport block, and taking the inversion processed serial number as the serial number of the current information transport block, includes:

performing inversion on former half bits or latter half bits of the serial number of the current information transport block, or inverting former half bits and latter half bits of the serial number of the current information transport block, when a serial number of the branch selected for transmitting the current information transport block is a serial number of the branch for transmitting the former information transport block added with or subtracted by different predefined values.

Supplement 22. The method according to supplement 15, wherein the information indicating branch selection is a serial number of a branch selected for transmitting the information transport block.

Supplement 23. The method according to supplement 15, wherein the information transport block is an error correction coding block.

Supplement 24. An information detection method, including:

receiving information transport blocks; wherein, in transmitting each information transport block, a serial number of a current information transport block is determined according to information of the current information transport block indicating branch selection or according to information of the current information transport block indicating branch selection and a serial number of a former information transport block of the current information transport block; and detecting the information indicating branch selection of the information transport blocks according to the serial number of the received information transport blocks.

Supplement 25. The method according to supplement 24, wherein the detecting the information indicating branch selection according to the serial number of the received information transport block includes:

detecting the information indicating branch selection of the information transport block according to a code distance between the serial number of the received information transport block and a serial number of the information transport block before transmission, and a code distance between the serial number of the received information transport block and a processed serial number of the information transport block before transmission.

What is claimed is:

1. An information transmission apparatus, comprising:
   a determining unit configured to determine serial numbers of information transport blocks to be transmitted; where, for each information transport block, the determining unit determines a serial number of a current information transport block by one of according to information of the current information transport block indicating branch selection and according to information of the current information transport block indicating branch selection along with a serial number of a former information transport block of the current information transport block; and
   a transmitting unit configured to transmit information transport blocks containing the serial numbers.

2. The apparatus according to claim 1, wherein the determining unit comprises:
   an addition unit configured to add a predefined value to the serial number of the former information transport block of the current information transport block, and use the serial number with the predefined value added as the serial number of the current information transport block when the branch selected for transmitting the current information transport block is not changed relative to a branch for transmitting the former information transport block; and
   a first processing unit configured to process the serial number with the predefined value added when the branch selected for transmitting the current information transport block is changed relative to the branch for transmitting the former information transport block, and use a processed serial number as the serial number of the current information transport block.

3. The apparatus according to claim 2, wherein the first processing unit is configured to perform inversion processing on one of a whole and a part of the serial number with the predefined value added when the branch selected for transmitting the current information transport block is changed relative to the branch for transmitting the former information transport block, and use an inversion processed serial number as the serial number of the current information transport block.

4. The apparatus according to claim 3, wherein the branch selected for transmitting the current information transport block being changed relative to the branch for transmitting the former information transport block refers to that the serial number of the branch selected for transmitting the current information transport block is the serial number of the branch for transmitting the former information transport block of the current information transport block with different predefined values one of added and subtracted; and the processing the serial number a with the predefined value added by the processing unit comprises: one of inverting one of former half bits and latter half bits of the serial number with the predefined value added, and inverting the former half bits and the latter half bits of the serial number with the predefined value added.

5. The apparatus according to claim 1, wherein the determining unit comprises:

a second processing unit configured to process the serial number of the current information transport block when a branch selected for transmitting the current information transport block is changed relative to the branch for transmitting the former information transport block, and use the processed serial number as the serial number of the current information transport block.

6. The apparatus according to claim 1, wherein the information indicating branch selection is a serial number of a branch selected for transmitting the information transport block.

7. The apparatus according to claim 1, wherein the information transport block is an error correction coding block.

8. An information detection apparatus, comprising:

a receiving unit configured to receive information transport blocks; where, in transmitting each information transport block, a serial number of a current information transport block is determined by one of according to information of the current information transport block indicating branch selection and according to information of the current information transport block indicating branch selection along with a serial number of a former information transport block of the current information transport block; and a detecting unit configured to detect information indicating branch selection of the information transport blocks according to the serial number of the received information transport blocks.

9. The apparatus according to claim 8, wherein the detecting unit detects the information indicating branch selection of the information transport blocks according to a code distance between the serial number of the received information transport block and the serial number of the information transport block before transmission, and a code distance between the serial number of the received information transport block and a processed serial number of the information transport block before transmission.

10. A transmitter, comprising the apparatus as claimed in claim 1.

* * * * *